Patented Feb. 23, 1954

2,670,385

UNITED STATES PATENT OFFICE 2,670,385

PROCESS FOR PREPARING ALCOHOLS FROM OLEFINS

Robert W. Rosenthal, Poughkeepsie, and Ernest A. Naragon, Glenham, N. Y., assignors to The Texas Company, New York, N. Y., a corporation of Delaware No Drawing. Application June 16, 1950, Serial No. 168,648

6 Claims. (Cl. 260—632)

This invention relates to a novel process for preparing alcohols from olefins, carbon monoxide and hydrogen. More particularly, this invention discloses a one-step process for preparing alcohols by the reaction of olefins with carbon monoxide and hydrogen.

It is well known that alcohols can be produced by the reaction of olefins, carbon monoxide and hydrogen through the intermediate production of a carbonylic product which is predominantly aldehydic in nature. The reaction of olefins, carbon monoxide and hydrogen employing a metal of the iron group, preferably cobalt, as a catalyst produces a product comprising aldehydes and ketones which product is converted to alcohols by a separate hydrogenation step. It has been necessary previously to effect the hydrogenation alcohol-forming step separately from the aldehyde-forming step because carbon monoxide poisons the hydrogenating activity of a cobalt catalyst. The usual procedure for converting olefins to alcohols involves formation of carbonylic product by reaction of olefins with carbon monoxide and hydrogen, treatment of the carbonylic product for removal of cobalt carbonyl and hydrogenation of the carbonylic product with CO-free hydrogen stream employing either the same cobalt catalyst or another conventional hydrogenation catalyst such as Raney nickel. The process of this invention effects alcohol production from olefins, carbon monoxide and hydrogen in one step without intermediate treatment of the carbonylic product and without utilization of a CO-free hydrogen stream.

In accordance with the process of this invention, alcohols are produced by the reaction of olefins, carbon monoxide and hydrogen at temperatures between 100 and 400° F. and at a pressure between 300 and 5000 pounds per square inch in the presence of a catalyst comprising a metal carbonyl of the iron group and nickel halide. The incorporation of nickel halide in a metal carbonyl carbonylation catalyst and particularly in cobalt carbonyl catalyst eliminates the poisoning effect of carbon monoxide on the hydrogenating capacity of cobalt so that carbonylation of olefins and hydrogenation of the carbonylic product is effected in a unitary operation.

The process of this invention is characterized by a plurality of advantages. The main advantage is that a simple one-step process for preparing alcohols from olefins, carbon monoxide and hydrogen is made available. As a result of this invention the troublesome two-step process formerly required for the preparation of alcohols from olefins is supplanted by a simple unitary procedure. The equipment and operation costs are approximately cut in half.

A second advantage is that the requirement of high purity hydrogen for the alcohol-forming hydrogenation step has been eliminated. One of the major expenses of the former process for producing alcohols from olefins was the cost of high purity hydrogen. It was necessary either to erect the alcohol plant near a source of high purity hydrogen or install equipment for the manufacture of hydrogen from synthesis gas by the water gas shift reaction. The process of the subject invention employs synthesis gas to effect both carbonylation and hydrogenation in a single operation.

The discovery that the addition of nickel chloride to preformed metal carbonyl carbonylation catalysts and to preformed cobalt carbonyl in particular permits the production of alcohols from olefins in one step is a substantial advance in the field of alcohol production from olefins. Apparently the presence of nickel chloride produces a metal carbonyl catalyst which has a dual function of catalyzing the reaction of olefins with carbon monoxide and hydrogen to form a carbonylic product and of acting as a catalyst for the hydrogenation of the carbonylic product to an alcohol. This dual purpose catalyst comprises approximately 50 to 98 percent cobalt carbonyl and between about 2 and 50 percent nickel chloride in a solvent carrier. The total cobalt carbonyl-nickel halide mixture constitutes up to about 50 weight percent of the solvent carrier and ordinarily 10 to 25 weight percent of the carrier.

The novel catalyst may comprise a carbonyl of any metal of the iron group plus a nickel halide; a particularly preferred catalyst is preformed cobalt carbonyl plus nickel chloride. Preformed cobalt carbonyl, $Co(CO)_4$, is prepared by the action of a carbon monoxide-hydrogen mixture in the presence of a solvent at elevated pressure in the range of 3000 pounds per square inch and at a temperature of about 325° F. on a cobalt salt, such as cobalt carbonate, or on a reduced cobalt catalyst, such as cobalt-Filter Cel or cobalt-alumina. Advantageously the cobalt carbonyl formation is effected in the presence of benzene, but other inert solvents such as ether, acetone, kerosene, naphtha, toluene may be used in cobalt carbonyl formation. The cobalt content of the resulting cobalt carbonyl solutions is about 1 to 10 percent. Nickel halide in the form of finely divided powder is added to the cobalt carbonyl solutions in an amount approximately equivalent to or less than the cobalt carbonyl content of the solution.

The incorporation of any nickel halide or of a mixture of nickel halides in cobalt carbonyl catalysts has the effect of producing a catalyst which results in a predominant quantity of alcohol in a one stage conversion of olefin, carbon monoxide and hydrogen. Nickel chloride is the preferred promoter.

The novel alcohol-forming reaction of this invention is effected at a temperature of 150 to 400° F. Temperatures in the lower part of the stated broad range tend to give larger quantities of carbonylic products so that it is advisable to maintain the operating temperature in the upper portion of the specified range, e. g., between 250 and 350° F.

Pressures ranging from 300 to 5000 pounds per square inch and higher may be employed for the novel reaction of this invention. However, it has been discovered that pressures between 2000 and 4000 pounds per square inch are particularly effective for the formation of alcohols by the reaction of olefins, carbon monoxide and hydrogen in the presence of a cobalt carbonyl-nickel halide catalyst.

The formation of alcohols from olefins, carbon monoxide and hydrogen can be effected batchwise or in a continuous slurry system. Continuous slurry system is preferred for large scale commercial operation. In continuous operation provision must be made that a contact time of at least about 10 minutes is maintained.

The stoichiometric ratio for the production of alcohols by the reaction of carbon monoxide and hydrogen with olefins is 2 mols of hydrogen for each mol of olefin and carbon monoxide. In operation a large excess of carbon monoxide and hydrogen is ordinarily employed. The ratio of hydrogen to carbon monoxide in the excess $H_2$-CO mixture is at least 1:1 and is ordinarily in the range of about 2:1. It will be observed that preferred $H_2$-CO mixture is the normal 2:1 mixture employed in the production of synthetic gasoline. It is apparent that the novel reaction of this invention for the production of alcohols can be employed in conjunction with a synthetic gasoline plant from which both a 2:1 $H_2$-CO mixture and an olefin-rich fraction are available.

The details of preparation of cobalt carbonyl-nickel chloride are outlined in Example I. Other nickel halides are incorporated in metal carbonyl solutions by similar procedure.

EXAMPLE I

A solution of 46.5 g. of cobalt carbonate in 700 ml. of benzene was heated at 325° F. under a pressure of 3000 p. s. i. g. of 1/1 carbon monoxide-hydrogen gas mixture. The solution was maintained at a temperature of about 325° F. for a period of about 5 hours, at which time no further gas adsorption occurred. The solution was filtered and 20 g. of finely powdered nickel chloride was added to 175 ml. of the filtrate, whereby there was formed a slurry. This slurry was the catalyst employed in subsequent examples.

The following examples illustrate the conversion of olefins, carbon monoxide and hydrogen directly to alcohols employing novel nickel halide-promoted cobalt carbonyl catalysts. Example II illustrates the results obtained employing a conventional catalyst consisting of a benzene solution of cobalt carbonyl. Examples III and IV illustrate conversions with nickel halide-promoted cobalt carbonyl catalysts.

EXAMPLE II

Into a high pressure reaction vessel 361 g. of octene-1 and 175 ml. of 6 percent solution of cobalt carbonyl in benzene were introduced. The unit was pressured to 3000 p. s. i. g. with 1/1 carbon monoxide-hydrogen gas and heated at 271° F. for 2¼ hours. The unit was cooled, brought to atmospheric pressure and the contents were then distilled in vacuum in the absence of air. 46 percent of the total product distilled in the $C_9$ boiling point range. Analysis of this product indicated that it contained 25 percent alcohol, 5 percent acid and 70 percent aldehyde.

EXAMPLE III

Octene-1 was reacted with carbon monoxide and hydrogen under the same reaction conditions disclosed in Example II with the exception that the 175 ml. of benzene solution of cobalt carbonyl contained 20 g. of nickel chloride prepared as described in Example I. 72 percent of the total product distilled in the $C_9$ boiling point range. Analysis of the total $C_9$ product indicated that it comprised 75 percent alcohol, 11 percent acid and 14 percent aldehyde.

EXAMPLE IV

Octene-1 was reacted with carbon monoxide and hydrogen under the same conditions set forth in Example II with the exception that the catalyst comprised 175 ml. of benzene solution of cobalt carbonyl plus 10 g. of nickel iodide. 47 percent of the reaction product distilled in the $C_9$ boiling point range. On analysis, the total $C_9$ product was shown to comprise 85 percent alcohol, 7 percent aldehyde and 5 percent acid.

In the table there are summarized the results obtained with conventional cobalt catalysts and with nickel halide-promoted cobalt carbonyl catalysts in the reaction of octylene-1 with carbon monoxide and hydrogen.

*Table*

| Catalyst | Percent Product in $C_9$ B. P. Range | Analysis of $C_9$ Product | | |
|---|---|---|---|---|
| | | Percent Alcohol | Percent Aldehyde | Percent Acid |
| $Co(CO)_4$ | 46 | 25 | 70 | 5 |
| $Co(CO)_4 + NiCl_2$ | 72 | 75 | 14 | 11 |
| $Co(CO)_4 + NiI_2$ | 47 | 85 | 7 | 5 |

It is apparent from the above table that the carbonylation product employing conventional pre-formed cobalt carbonyl catalysts is mainly aldehydic in nature, whereas a product which is mainly alcoholic is obtained with nickel halide-promoted cobalt carbonyl catalysts.

The incorporation of the nickel halide in pre-formed iron and nickel carbonyl catalysts has a similar effect of producing alcohols in one step. Iron and nickel carbonyl catalysts promoted with nickel halide are produced in a similar manner to the described procedure for nickel halide-cobalt carbonyl catalysts.

Obviously many modifications and variations of the invention, as hereinbefore set forth, may be made without departing from the spirit and scope thereof, and therefore only such limitations should be imposed as are indicated in the appended claims.

We claim:

1. A process for effecting a one step reaction between olefins, carbon monoxide and hydrogen so as to give a product consisting mainly of alcohols which comprises reacting an olefin with carbon monoxide and hydrogen at a temperature between 250 and 350° F. and at a pressure from 300 to 5000 p. s. i. g. in the presence of a catalyst comprising carbonyl of a metal of the iron group and nickel halide.

2. A process for effecting a one step reaction between olefins, carbon monoxide and hydrogen so as to give a product consisting mainly of alcohols which comprises reacting an olefin with carbon monoxide and hydrogen at a temperature between 250 and 350° F. and at a pressure from 300 to 5000 p. s. i. g. in the presence of a catalyst comprising cobalt carbonyl and nickel halide.

3. A process according to claim 2 in which the catalyst comprises cobalt carbonyl and nickel chloride.

4. A process according to claim 2 in which the catalyst comprises cobalt carbonyl and nickel iodide.

5. A process according to claim 2 in which the catalyst comprises a mixture of cobalt carbonyl and nickel halide in a solvent carrier.

6. A process according to claim 2 in which the catalyst comprises approximately 50 to 98 per cent cobalt carbonyl and 2 to 50 per cent nickel halide.

ROBERT W. ROSENTHAL.
ERNEST A. NARAGON.

References Cited in the file of this patent

UNITED STATES PATENTS

| Number | Name | Date |
|---|---|---|
| 2,327,066 | Roelen | Aug. 17, 1943 |
| 2,449,470 | Gresham | Sept. 14, 1948 |

FOREIGN PATENTS

| Number | Country | Date |
|---|---|---|
| 564,148 | France | Dec. 21, 1923 |

OTHER REFERENCES

De Bell et al.: "German Plastics Practice," published by De Bell and Richardson, Springfield, Mass. (1946), page 516.

Wender et al.: Journal American Chemical Society, vol. 72, pages 4375–4378, October 1950. Article received by publisher, Feb. 23, 1950.